M. LEITCH.
MILKING MACHINE.
APPLICATION FILED FEB. 16, 1915.

1,163,161.

Patented Dec. 7, 1915.

WITNESSES:
Robt P Mitchel
E. E. Wall

INVENTOR
Meredith Leitch
BY Frank J Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,163,161.   Specification of Letters Patent.   Patented Dec. 7, 1915.

Application filed February 16, 1915. Serial No. 8,455.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

My invention relates to the class of milking machines having two-chambered teat cups. It is more particularly intended for application to that class of machines, having two-chambered teat cups, in which an approximately continuous vacuum is maintained in the inner or teat-receiving chambers, while in the outer or pulsation chambers the pressure is varied so as to cause regular manipulations of the teats.

The object of the invention is to provide a machine in which one pump cylinder or its equivalent serves to cause a constant suction on the nipples of the teats, and to produce pulsations in the outer teat cup chambers to cause a manipulation of the upper portion of the base of the teat.

Figure 1:
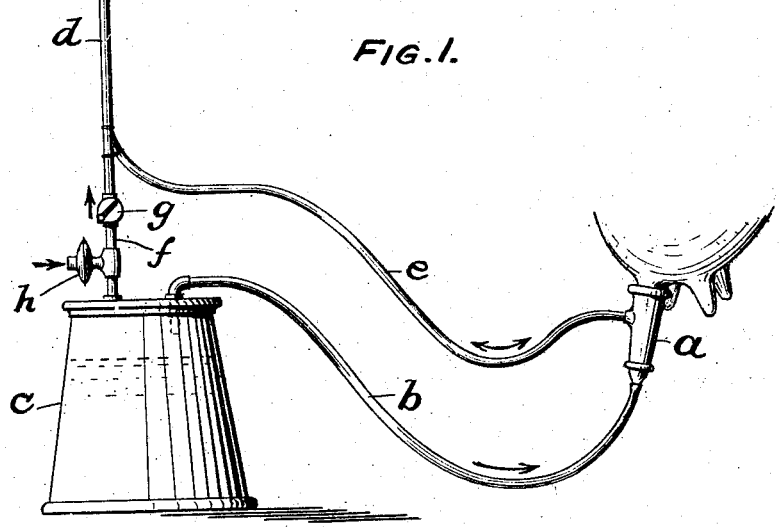
Figure 2:
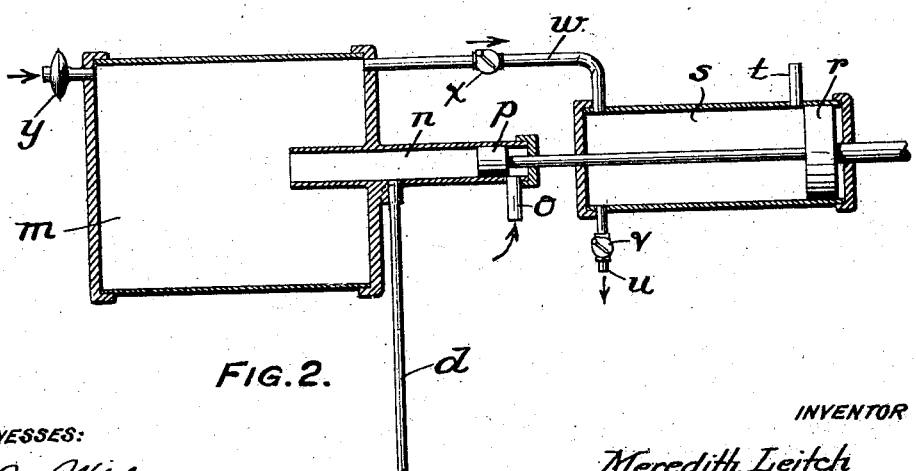

In the accompanying drawings, which show preferred embodiments of my invention: Figure 1 is a diagrammatic view of the installation. Fig. 2 is a similar view of a modification.

The inner or teat receiving chamber of the two-chambered teat cup *a* is connected by a flexible tube *b* with a milk pail *c*. From one end of a pump cylinder *j* extends a pipe *d* having branches *e* and *f*, the former connected with the outer or pulsation chamber of the teat cup *a*, and the latter communicating with the milk pail *c*. In branch *f* is a check valve *g* allowing air to pass from the pail but preventing its return. Connecting with branch *f* between check valve *g* and the pail is a regulating valve *h* designed to open and admit air if, at any time, the vacuum in the pail exceeds a predetermined value. In the cylinder *j* reciprocates a piston *i*. Near the end of the cylinder with which pipe *d* communicates is a by-pass *l* and near the other end of the cylinder is an inlet port *k*.

While only one teat cup is shown, it will be understood that each of the pipes *e* and *b* is intended to have four branches connected to four similar teat cups.

In operation, piston *i* reciprocates practically the full length of cylinder *j*. During its outward stroke (to the right, Fig. 1), it exhausts air from pipes *d*, *e*, *f*, the outer teat cup chamber, the milk pail *c*, the pipe *b* and the inner teat cup chamber. When the piston reaches the outer end of its stroke, it uncovers port *k* and allows air to enter the pump cylinder, the pipes *d* and *e*, and the outer teat cup chamber. During the return stroke of the pump (to the left, Fig. 1) the air is compressed in these spaces until the piston, reaching the position, shown in Fig. 1, between the two ports of the by-pass *l*, allows the air to escape behind the piston and out the inlet port *k*. During this return stroke of the piston, check valve *g* prevents the return of any air to the pail, so that after a few strokes of the pump the air is exhausted from the pail to the desired extent, and thereafter, at each stroke, a small amount of air is admitted through the regulator *h* to prevent the vacuum becoming too great. Because of its connection with the pail through pipe *b*, the inner teat cup chamber is under an approximately constant suction slightly less than the maximum produced by the pump. Because the outer teat cup chamber is in direct communication with the pump cylinder, the pressure therein varies from less than the lowest in the inner teat cup chamber to more than atmospheric. It will readily be understood that during the suction stroke of the pump the teat cups will be expanded and the suction will draw the teats into the cup and at the same time cause them to fill with milk, and that during the return stroke of the pump the teats will be compressed, the milk will be forced out and the suction will draw it into the pail.

In the event that it is desired to rely upon a maximum pressure equal to that of the atmosphere for the manipulation of the teats, a non-return air-discharge valve may be substituted for the by-pass *l* and a constant vacuum reservoir and a valve connecting the pipe *d* alternately with the reservoir and the atmosphere may be provided. One construction embodying such a modification is illustrated in Fig. 2, in which the pipe *d* is connected with a cylinder *n* opening at one end into a constant vacuum reservoir *m* and provided at the other end with an air port *o*. The rod of piston *r* of the pump cylinder *s* is extended through the heads of cylinders *s* and *n* and carries a piston head *p* working in cylinder *n*. Near one end of cylinder *s* is an air port *t*. At its other end is an air outlet port *u* having a check valve *v* preventing inflow of air. This end of cylinder *s* is connected by a pipe *w* with the constant vacuum reservoir *m*. The pipe *w* has a check valve *x* preventing flow of air from the pump cylinder *s* to the vacuum reservoir *m* but allowing air to flow in the opposite direction. The vacuum reservoir *m* has a regulating valve *y* designed to open and admit air when the vacuum in the vacuum reservoir exceeds a predetermined value.

In operation, piston *r* reciprocates practically the full length of cylinder *s*. During its outward stroke (to the right, Fig. 2), it exhausts air from pipe *w* and vacuum reservoir *m* and (piston *p* having uncovered pipe *d*) air is exhausted through pipes *d* and *f*, from the milk pail, through pipe *e* from the outer teat cup chamber, and through pipe *b* from the inner teat cup chamber. On the return stroke of pistons *r* and *p* pipe *d* is placed in communication, through cylinder *n* and port *o*, with the atmosphere, and air under atmospheric pressure enters pipes *d* and *e* and the outer teat cup chamber. Piston *p* thus acts as a valve to connect pipe *d* alternately with the vacuum reservoir and the atmosphere.

While the invention, in the embodiment set forth, provides for placing the inner teat cup chamber constantly under and in communication with a source of suction, the invention contemplates the possibility, by means of additions or modifications not herein disclosed, of intermittently admitting air into the milk passage between the inner teat cup chamber and the milk pail so as to produce pulsations in the inner teat cup chamber as well as the outer teat cup chamber. Such an arrangement would result in an operation substantially the same as in the Hulbert Patents No. 1,043,013 and No. 1,070,134. Machines exhibiting these characteristics and constituting, therefore, an improvement on the subject matter of this application, are set forth in applications filed of even date herewith.

I have not herein claimed specifically the construction shown in Fig. 2, as a similar construction, having the same mode of operation, is set forth in an application filed by me February 20, 1915, Serial No. 9500.

Having now fully described my invention, what I claim and desire to protect by Letters Patent is:

1. In a milking machine, in combination, a milk pail, a double chambered teat cup, and a common pipe line and means operatable therethrough to exhaust air from the pail and the inner chamber of said teat cup and to produce pneumatic pulsations in the outer chamber of said teat cup so as to intermittently compress the teat.

2. In a milking machine, in combination, a double chambered teat cup, a milk discharge from the inner chamber thereof, and common pulsating means connected with and operating to exhaust air from the milk discharge and connected with and operating to produce pulsations in the outer teat cup chamber.

3. In a milking machine, in combination, a double chambered teat cup, a milk discharge from the inner teat cup chamber closed from communication with the outer teat cup chamber, and common pulsating means to exhaust air from the outer teat cup chamber and milk discharge and to intermittently admit air into the outer teat cup chamber.

4. In a milking machine, in combination, a double chambered teat cup, a milk discharge connected with the inner teat cup chamber, a pipe communicating with both the milk discharge and the outer teat cup chamber, means to prevent flow of air from said pipe to the milk discharge, and means to produce pulsations in said pipe.

5. In a milking machine, in combination, a double chambered teat cup, a milk discharge communicating with the inner teat cup chamber and a pulsator adapted to control the flow of pressure fluid toward and from the outer teat cup chamber in such manner as to produce pulsations therein and adapted also to exhaust pressure fluid from the milk discharge.

6. In a milking machine, in combination, a double chambered teat cup, a milk discharge communicating with the inner teat cup chamber, a single pipe connectible both with the outer teat cup chamber and the milk discharge, means to produce pneumatic pulsations in said pipe, and a non-return valve between the milk discharge and said pipe preventing return of air from the pipe to the milk discharge.

7. In a milking machine, in combination, a double chambered teat cup, a milk pail connected with the inner teat cup chamber, and means operating through a single pipe to exhaust air from the milk pail and simultaneously exhaust foul air from the outer teat cup chamber without possibility of such foul air contaminating the milk.

8. In a milking machine, in combination, a double chambered teat cup, a milk discharge communicating with the inner teat cup chamber, a pipe leading to the outer teat cup chamber, means to prevent flow of air from said pipe to the milk discharge, and a primary pulsator adapted to control the flow of pressure fluid back and forth in said pipe so as to produce pulsations in the outer teat cup chamber and adapted also to ex- 9. In a milking machine, in combination, a double chambered teat cup, a milk discharge communicating with the inner teat cup chamber and closed from communication with the outer teat cup chamber, a single pipe connectible both with the outer teat cup and the milk discharge, means to produce pneumatic pulsations in said pipe, and a non-return valve between the milk discharge and said pipe preventing return of air from the pipe to the milk discharge.

10. In a milking machine, in combination, a double chambered teat cup, and common pulsating means to maintain a continuous suction in the inner teat cup chamber and to intermittently vary the pressure in the outer teat cup chamber from a value less than that in the inner teat cup chamber to a value substantially higher than that in the inner teat cup chamber.

11. In a milking machine, in combination, a double chambered teat cup, common pulsating means to maintain a partial vacuum in the inner teat cup chamber and to intermittently vary the pressure in the outer teat cup chamber from a value less than that in the inner teat cup chamber to a value not less than atmospheric pressure.

12. In a milking machine, in combination, a teat cup having an inner teat receiving chamber and an outer pulsation chamber, a milk pail connected with the inner teat cup chamber, and a single cylinder pump operating through a single pipe line to exhaust air from the milk pail and thus produce a continuous exhaust in the inner teat cut chamber and to produce pneumatic pulsations in the outer teat cup chamber so as to compress the teat and alternately therewith expand the teat cup and release the teats.

In testimony of which invention, I have hereunto set my hand, at Poughkeepsie, N. Y., on this 30th day of Jan., 1915.

MEREDITH LEITCH.

Witnesses:
CHARLES L. POWELL,
EDWARD F. WEIMAR.